(12) United States Patent
Ziegler

(10) Patent No.: US 12,093,771 B1
(45) Date of Patent: Sep. 17, 2024

(54) ASSET IDENTIFICATION USING RFID POWERED BY MOVEMENT OF A TRANSPORT PLATFORM

(71) Applicant: TelemeTrak, Inc., Oakland, CA (US)

(72) Inventor: Frederick Steinway Ziegler, San Francisco, CA (US)

(73) Assignee: TelemeTrak, Inc., Oakland, CA (US)

( * ) Notice: Subject to any disclaimer, the term of this patent is extended or adjusted under 35 U.S.C. 154(b) by 90 days.

(21) Appl. No.: 18/092,415

(22) Filed: Jan. 2, 2023

Related U.S. Application Data

(63) Continuation-in-part of application No. 17/092,264, filed on Nov. 7, 2020, now Pat. No. 11,544,516, (Continued)

(51) Int. Cl.
| | | |
|---|---|---|
| G08B 13/14 | (2006.01) |
| B60D 1/24 | (2006.01) |
| B60D 1/58 | (2006.01) |
| G01S 19/14 | (2010.01) |
| G01S 19/33 | (2010.01) |
| G06K 7/10 | (2006.01) |
| G06K 19/07 | (2006.01) |
| G06K 19/077 | (2006.01) |
| H04B 17/318 | (2015.01) |
| H04W 4/021 | (2018.01) |
| H04W 4/40 | (2018.01) |

(Continued)

(52) U.S. Cl.
CPC ......... *G06K 19/07766* (2013.01); *B60D 1/24* (2013.01); *B60D 1/58* (2013.01); *G01S 19/14* (2013.01); *G01S 19/33* (2013.01); *G06K 7/10297* (2013.01); *G06K 19/0723* (2013.01); *H04B 17/318* (2015.01); *H04W 4/021* (2013.01); *H04W 4/40* (2018.02); *H04W 4/80* (2018.02); *H04W 84/042* (2013.01); *H04W 84/06* (2013.01); *H04W 84/12* (2013.01)

(58) Field of Classification Search
CPC ........ G06K 19/07766; G06K 7/10297; G06K 19/0723; B60D 1/24; B60D 1/58; G01S 19/14; G01S 19/33; H04B 17/318; H04W 4/021; H04W 4/40; H04W 4/80; H04W 84/042; H04W 84/06; H04W 84/12
See application file for complete search history.

(56) References Cited

U.S. PATENT DOCUMENTS 10,073,451 B2 * 9/2018 Dotzler ............... G05D 1/0287
10,902,723 B2 * 1/2021 Doyle, III ............... G08G 1/20
(Continued)

*Primary Examiner* — Toan N Pham
(74) *Attorney, Agent, or Firm* — The Law Office of Raul D. Martinez, PC

(57) ABSTRACT

In some examples, interested parties would like to know the identity of various assets in a transportation environment. In some examples, the asset could be a tractor platform. In other examples, the asset could be cargo associated with a transport platform. Some of the examples described herein utilize the motion of a transport platform to power an RFID reader to read an identifier stored within an RFID tag that is coupled to an asset. In some examples, the system utilizes the identifier to identify the asset, which may be transmitted to an electronic device that is accessible to the interested parties. In further examples, a geolocation of the asset may also be transmitted to an electronic device that is accessible to the interested parties.

14 Claims, 4 Drawing Sheets

Related U.S. Application Data which is a continuation of application No. 16/132,448, filed on Sep. 16, 2018, now Pat. No. 10,878,305.

(51) Int. Cl.
*H04W 4/80* (2018.01)
*H04W 84/04* (2009.01)
*H04W 84/06* (2009.01)
*H04W 84/12* (2009.01)

(56) References Cited

U.S. PATENT DOCUMENTS

2018/0293891 A1* 10/2018 Troutman ............... G08G 1/13
2021/0409925 A1* 12/2021 Suda ..................... H04W 4/80

* cited by examiner

ASSET IDENTIFICATION USING RFID POWERED BY MOVEMENT OF A TRANSPORT PLATFORM

CLAIM OF PRIORITY

This application is a continuation-in-part of and claims priority to U.S. patent application Ser. No. 17/092,264, now U.S. Pat. No. 11,544,516, entitled "SYSTEM FOR THE IDENTIFICATION OF A TRACTOR PLATFORM COUPLED TO A TOWED TRANSPORT PLATFORM)" and filed Nov. 7, 2020, which is a continuation of U.S. patent application Ser. No. 16/132,448, now U.S. Pat. No. 10,878,305, entitled "SYSTEM FOR THE IDENTIFICATION OF A TRACTOR PLATFORM COUPLED TO A TOWED TRANSPORT PLATFORM" and filed Sep. 16, 2018, both of which are assigned to the assignee hereof and hereby expressly incorporated by reference in their entirety.

BACKGROUND

In the field of shipping and transportation, interested parties to a shipment, such as a trucking company, a leasing company, a buyer, a seller, an insurer, or a regulatory governmental entity, may wish to monitor a shipment.

DETAILED DESCRIPTION

Figure 1:
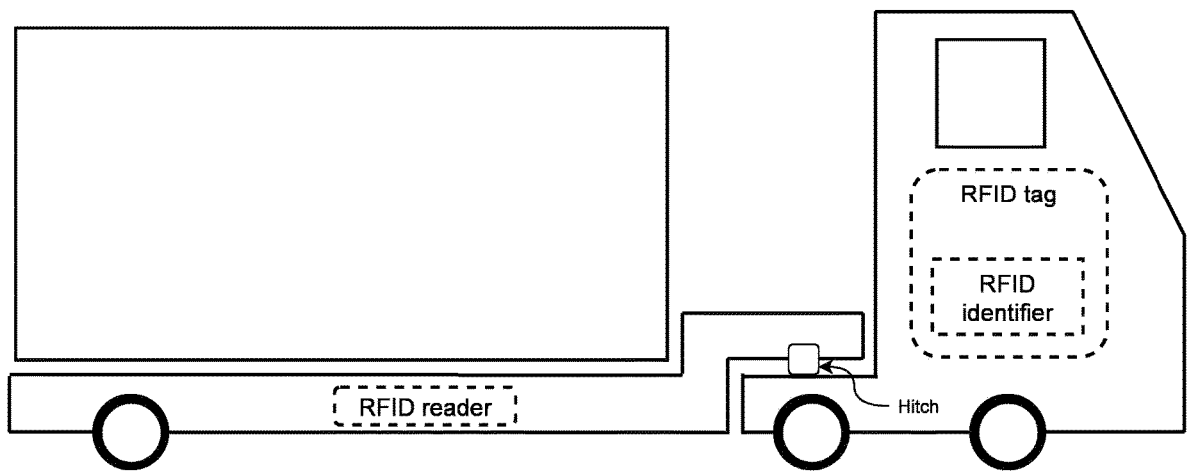
FIG. 1 is an example of a system in which an RFID tag is mounted on a tractor platform and an RFID reader is mounted on a towed transport platform such that said RFID tag is within the RFID range of said RFID reader whenever said towed transport platform is hitched to said tractor platform.

In the current state of the art, monitoring systems such as the Orbcomm GT-1100 offer monitoring hardware and services for trailers. These services may include GPS tracking, the connection and disconnection of a trailer to and from a tractor unit, respectively, the loading and unloading of an intermodal container onto and from from a chassis, respectively, the opening and closing of doors, motion start/stop detection, heartbeat reporting, and cellular network jamming detection. Communications between a trailer and a server are implemented using cellular or combined satellite-cellular communications. Power is provided by a solar panel and rechargeable battery. The GT-1100 may incorporate a 3-axis accelerometer, four 16-bit AID converters, one CAN bus interface, four GPIOs, one RS-232 serial interface, one RS-485 serial interface, and/or one USB interface.

A tractor unit accessing certain shipping ports may have an RFID tag placed on it in order to expedite its entry into and exit from said ports, and such an RFID tag is required in certain cases. For example, tractor units entering the Ports of Los Angeles, California and Long Beach, California are required to be equipped with a TruckTag, a type of RFID tag. Often, a tractor unit accesses a shipping port in order to deliver and/or pick up one or more shipments. Such shipments may be contained in intermodal containers which are then loaded onto chassis, or they may be contained in trailers.

A tractor unit may have an RFID tag placed on it for purposes other than accessing a shipping port. For example, a tractor unit may have an RFID tag placed on it for purposes of expedited weigh station bypass, such as HELP, Inc.'s PrePass system. Another example is RFID tags placed on a tractor unit to expedite its transit through toll stations on roads and bridges and highways. The E-ZPass electronic toll collection system used in parts of the Midwestern and Eastern United States is one such system, and the FasTrak electronic toll collection system used in the state of California is another such system.

The GT-1100 hardware and services do not detect the RFID of a tractor unit that is towing a chassis or trailer equipped with a GT-1100.

An interested party to a shipment being towed on a trailer or chassis, such as a trucking company towing it, a leasing company leasing the trailer or chassis carrying it, its buyer, its seller, its insurer, or a governmental entity that regulates it, may wish to know the RFID of the tractor unit towing it. This information can be used to verify that the correct tractor unit is towing the shipment, and it may alert one or more parties to misuse or theft of the shipment if the tractor unit towing it has the wrong RFID tag or no RFID tag at all. The time when the RFID tag is initially detected indicates when the trailer or chassis carrying the shipment is coupled to the tractor unit and when it is picked up. The time when the RFID tag is no longer detected indicates when the trailer or chassis carrying the shipment is uncoupled from the tractor unit and it was dropped off.

One or more embodiments detect and report the RFID identifier of the tractor platform to which a towed transport platform is coupled.

Some definitions of terms used herein follows.
I. Coupling Terminology
  1.1 In one embodiment, if a first physical object is physically coupled to a second physical object and said second physical object is physically coupled to a third physical object, then said first physical object is physically coupled to said third physical object.
  1.2 In one embodiment, if a first physical object is physically coupled to a second physical object then said second physical object is physically coupled to said first physical object.
  1.3 In one embodiment, if a first electronic device is communicably coupled to a second electronic device and said second electronic device is communicably coupled to a third electronic device, then said first electronic device is communicably coupled to said third electronic device.
  1.4 In one embodiment, if a first electronic device is communicably coupled to a second electronic device then said second electronic device is communicably coupled to said first electronic device.
  1.5 In one embodiment, if a first electronic device is communicably coupled to a second electronic device then said first electronic device may communicate with said second electronic device.

2 Trucking Terminology
  2.1 In one embodiment, physical goods comprise cargo.
  2.2 In one embodiment, a towed transport platform comprises a means for supporting a load and being towed on roads.
  2.3 In one embodiment, a restraining mechanism comprises a means for restraining physical goods wherein said means may be physically coupled to a towed transport platform.
  2.4 In one embodiment, a container comprises a restraining mechanism wherein said means for restraining said physical goods comprises side walls.
  2.5 In one embodiment, a tractor platform comprises a motive power source and a means for towing a towed transport platform.
  2.6 In one embodiment, a method for transporting physical goods comprises a restraining mechanism restraining said physical goods wherein said restraining mechanism is physically coupled to a towed transport platform that is physically coupled to a tractor platform.
  2.7 In one embodiment, a tractor unit comprises a towing engine that provides motive power for hauling a towed or trailered load.
  2.8 In one embodiment, a tractor platform comprises a tractor unit.
  2.9 In one embodiment, a trailer comprises a towed transport platform physically coupled to a container.
  2.10 In one embodiment, a flatbed trailer comprises a towed transport platform wherein a restraining mechanism that may be physically coupled to said towed transport platform does not comprise side walls.
  2.11 In one embodiment, a transport mode comprises a method for transporting goods over geographical distances.
  2.12 In one embodiment, a transport mode comprises shipping by means of ships on water.
  2.13 In one embodiment, a transport mode comprises trucking by means of trucks on roads.
  2.14 In one embodiment, a transport mode comprises rail by means of trains on railroad tracks.
  2.15 In one embodiment, an intermodal container comprises a container that may be transported by means of a plurality of transport modes wherein said container may be physically coupled to and physically uncoupled from said transport modes without unloading said physical goods from or reloading said physical goods into said container.
  2.16 In one embodiment, an intermodal container comprises a standardized shipping container wherein said container is designed and built for intermodal freight transport.
  2.17 In one embodiment, an intermodal container comprises a means for containing physical goods wherein said means may be transported by different transport modes without unloading or reloading said physical goods.
  2.18 In one embodiment, a chassis comprises a towed transport platform with a means for physically coupling one or more intermodal containers to said towed transport platform.
  2.19 In one embodiment, a loaded chassis comprises a chassis physically coupled to one or more intermodal containers.
  2.20 In one embodiment, a trailer comprises a loaded chassis.

3 Shipping Entity Terminology
  3.1 In one embodiment, an entity comprises a person.
  3.2 In one embodiment, an entity comprises a group of persons.
  3.3 In one embodiment, an entity comprises a legal entity.
  3.4 In one embodiment, an entity comprises a business entity.
  3.5 In one embodiment, an entity comprises a governmental entity.
  3.6 In one embodiment, an entity comprises a non-profit entity.
  3.7 In one embodiment, an entity comprises an institution.
  3.8 In one embodiment, a trucking entity comprises an entity that operates one or more tractor platforms.
  3.9 In one embodiment, a trucking entity comprises an entity that operates one or more tractor platforms for the purpose of towing one or more towed transport platforms.
  3.10 In one embodiment, a leasing entity comprises an entity that leases one or more towed transport platforms to one or more trucking entities.
  3.11 In one embodiment, a shipment comprises a transportation of physical goods from one location to another.
  3.12 In one embodiment, a shipment comprises physical goods wherein said physical goods are transported from one location to another.
  3.13 In one embodiment, a shipment comprises a transportation of one or more towed transport platforms from one location to another.
  3.14 In one embodiment, a shipment comprises a towed transport platform wherein said towed transport platform is transported from one location to another.
  3.15 In one embodiment, an interested party comprises an entity that is a party to a shipment.
  3.16 In one embodiment, an interested party comprises a trucking entity.
  3.17 In one embodiment, an interested party comprises a leasing entity.
  3.18 In one embodiment, an interested party comprises a seller of a shipment.
  3.19 In one embodiment, an interested party comprises a buyer of a shipment.
  3.20 In one embodiment, an interested party comprises an entity that insures a shipment.
  3.21 In one embodiment, an interested party comprises a governmental entity that regulates a shipment.
4 Geolocation Terminology
  4.1 In one embodiment, a geolocation comprises the identification or estimation of the real-world geographic location of an object.
  4.2 In one embodiment, a geolocation comprises a latitude and a longitude.
  4.3 In one embodiment, a geolocation comprises a latitude, a longitude, and an altitude.
  4.4 In one embodiment, a geolocation comprises a geographic location expressed in an earth-based coordinate system.
  4.5 In one embodiment, a geolocation comprises a time measurement.
  4.6 In one embodiment, a satellite-based radio-navigation system comprises a global navigation satellite system ("GNSS").
  4.7 In one embodiment, a satellite-based radio-navigation system comprises the United States Global Positioning System ("GPS").

4.8 In one embodiment, a satellite-based radio-navigation system comprises Russia's GLONASS.

4.9 In one embodiment, a satellite-based radio-navigation system comprises the European Union's Galileo system.

4.10 In one embodiment, a satellite-based radio-navigation system comprises China's BeiDou Navigation Satellite System ("BDS").

4.11 In one embodiment, a satellite-based radio-navigation system comprises India's IRNSS.

4.12 In one embodiment, a satellite-based radio-navigation system comprises Japan's QZSS.

4.13 In one embodiment, a geolocation is measured by means of one or more satellite-based radio-navigation systems.

4.14 In mathematics, a hyperbola is defined as the set of points such that for any point P of the set, the absolute difference of the distances from P to two fixed points is constant.

4.15 In one embodiment, a geolocation hyperbola comprises a hyperbola wherein said two fixed points are the geolocations of two stations broadcasting radio signals.

4.16 In one embodiment, a means for constructing a geolocation hyperbola of the set of possible geolocations of a radio receiver comprises measuring the time delay of a signal sent from each broadcasting station to said radio receiver within an interval of time and calculating the absolute difference of the distances from said radio receiver to said broadcasting stations as the difference in said time delays multiplied by the speed of light.

4.17 In one embodiment, a multilateration algorithm comprises a means for measuring the geolocation of a radio receiver calculated as the intersection of two geolocation hyperbolas for said radio receiver wherein said two geolocation hyperbolas are calculated using no fewer than three broadcasting stations.

4.18 In one embodiment, a multilateration algorithm comprises a means for measuring a geolocation based on measurements of the distance to three or more stations at known geolocations by broadcast signals at known times, wherein said geolocation is calculated by means of triangulation.

4.19 In one embodiment, a geolocation is measured by means of a multilateration algorithm wherein said stations are cellular phone towers.

4.20 In one embodiment, a multilateration navigation system comprises means for determining a geolocation by means of a multilateration algorithm.

4.21 In one embodiment, a navigation system comprises a means for reading one or more geolocations by means of either a satellite-based radio-navigation system or a multilateration navigation system.

4.22 In one embodiment, a navigation system comprises a plurality of navigation systems.

4.23 In one embodiment, a navigation system comprises a means for reading one or more geolocations by means of a plurality of satellite-based radio-navigation systems and a multilateration navigation systems.

5 RFID Terminology 5.1 In one embodiment, radio-frequency identification technology comprises a means for using electromagnetic fields to read tags physically coupled to objects.

5.2 In one embodiment, RFID comprises radio-frequency identification technology.

5.3 In one embodiment, an RFID identifier comprises a unique identifier that may be read by means of a radio-frequency identification technology.

5.4 In one embodiment, an RFID tag comprises a means for storing an RFID identifier.

5.5 In one embodiment, an RFID identifier is unique to the RFID tag in which it is stored.

5.6 In one embodiment, an RFID reader comprises a means for reading an RFID identifier that is stored in an RFID tag.

5.7 In one embodiment, an RFID reader reads one and only one RFID identifier from an RFID tag.

5.8 In one embodiment, an RFID signal strength comprises the electromagnetic signal strength received from an RFID tag measured by the RFID reader reading said RFID tag.

5.9 In one embodiment, an RFID signal strength is associated with the RFID identifier with which it was read.

5.10 In one embodiment, a means for calculating the distance between an RFID reader and an RFID tag wherein said RFID reader reads said RFID tag is to calculate said distance by multiplying an empirically determined value with the inverse of the square root of the RFID signal strength read by said RFID reader.

5.11 In one embodiment, a means for calculating the distance between an RFID reader and an RFID tag wherein said RFID reader reads said RFID tag is by means of an empirically determined formula.

5.12 In one embodiment, a means for calculating the distance between an RFID reader and an RFID tag wherein said RFID reader reads said RFID tag is to calculate said distance as proportional to the inverse of the square root of the RFID signal strength read by said RFID reader.

5.13 In one embodiment, an RFID reader comprises a means for reading an RFID identifier that is stored in an RFID tag and for reading the RFID signal strength from said RFID tag.

5.14 In one embodiment, an RFID range comprises a maximum distance between an RFID reader and an RFID tag within which said RFID reader may read said RFID identifier of said RFID tag.

5.15 In one embodiment, an RFID range may vary with time, geometric orientation to an RFID tag, geolocation, and other factors.

5.16 In one embodiment, an RFID reader scans for RFID tags within said RFID reader's RFID range.

5.17 In one embodiment, an RFID scan comprises an RFID reader's periodic scan for RFID tags within said RFID reader's RFID range.

5.18 In one embodiment, a towed transport platform RFID reader comprises an RFID reader physically coupled to a towed transport platform.

5.19 In one embodiment, an RFID reader is physically coupled to a tractor platform.

5.20 In one embodiment, a tractor platform RFID tag comprises an RFID tag physically coupled to a tractor platform.

5.21 In one embodiment, a tractor platform identifier comprises the RFID identifier stored in an RFID tag physically coupled to a tractor platform.

5.22 In one embodiment, an RFID tag is physically coupled to a towed transport platform.

5.23 In one embodiment, an RFID identifier/signal strength pair comprises an RFID identifier read from an RFID tag combined with the RFID signal strength from said RFID tag at the time said RFID tag was read.

5.24 In one embodiment, the noun "set" refers to a mathematical set and all of the attendant operations that may be performed on a mathematical set.

5.25 In one embodiment, a RFID set comprises the set of all RFID identifiers read from RFID tags by a towed transport platform RFID reader within a period of time.

5.26 In one embodiment, a RFID set comprises the set of all RFID identifiers read in an RFID scan.

5.27 In one embodiment, a RFID set comprises the set of all RFID identifier/signal strength pairs read from RFID tags by a towed transport platform RFID reader within a period of time.

5.28 In one embodiment, a set of RFID sets comprises a plurality of RFID sets.

5.29 In one embodiment, a common RFID identifier comprises an RFID identifier in a set of RFID sets wherein said RFID identifier is contained in each of said RFID sets.

5.30 In one embodiment, the common RFID set comprises the mathematical intersection of the RFID sets contained in a set of RFID sets.

5.31 In one embodiment, an RFID signal strength average comprises the mathematical average of all the RFID signal strengths associated with a single RFID identifier contained in a set of RFID sets.

The RFID signal strength average may help to distinguish which tractor platform is towing a towed transport platform in the cases, such as a convoy, in which multiple RFID tags are continually within range of an RFID reader. In this case, the towing tractor platform may remain closer to the RFID reader than the other tractor platforms, resulting in a higher RFID signal strength average. In addition, empirical measurements of the RFID signal strength from the towing tractor platform's RFID tag may show that a specific range of RFID signal strengths distinguishes the RFID tag of the towing tractor platform from other RFID tags.

5.32 In one embodiment, an RFID signal strength standard deviation comprises the mathematical standard deviation of all the RFID signal strengths associated with a single RFID identifier contained in a set of RFID sets.

The RFID signal strength standard deviation may help to distinguish which tractor platform is towing a towed transport platform in cases, such as a convoy, in which multiple RFID tags are continually within range of an RFID reader. In this case, the towing tractor platform should remain at the roughly same distance from the RFID reader while the distance to the other tractor platforms may vary more.

Thus, RFID tag of the towing tractor platform may have the smallest RFID signal strength standard deviation. In addition, empirical testing may show that a specific range of RFID signal strength standard deviations distinguishes the towing tractor platform's RFID tag from others.

5.33 In one embodiment, an RFID signal strength mathematical analysis comprises an analysis by means of mathematical operations on a combination of RFID signal strength averages, RFID signal strength standard deviations, and empirical RFID signal strength data.

5.34 In one embodiment, a unique RFID identifier comprises a common RFID identifier wherein no other RFID identifier is contained in each of said RFID sets.

5.35 In one embodiment, a unique RFID identifier comprises a common RFID identifier wherein the RFID signal strength average of said common RFID identifier is greater than the RFID signal strength average of any other common RFID identifier contained in said set of RFID sets.

5.36 In one embodiment, a unique RFID identifier comprises a common RFID identifier wherein the RFID signal strength average of said common RFID identifier is closer to an empirically determined value than the RFID signal strength average of any other common RFID identifier contained in said set of RFID sets.

5.37 In one embodiment, a unique RFID identifier comprises a common RFID identifier wherein the RFID signal strength standard deviation of said common RFID identifier is less than the RFID signal strength standard deviation of any other common RFID identifier contained in said set of RFID sets.

5.38 In one embodiment, a unique RFID identifier comprises a common RFID identifier wherein the RFID signal strength standard deviation of said common RFID identifier is closer to an empirically determined value than the RFID signal strength standard deviation of any other common RFID identifier contained in said set of RFID sets.

5.39 In one embodiment, a unique RFID identifier comprises a common RFID identifier wherein said common RFID identifier is determined by means of an RFID signal strength mathematical analysis of the common RFID identifiers in said set of RFID sets.

5.40 In one embodiment, a plurality of unique RFID identifiers comprises the common RFID identifiers in said set of RFID sets wherein said set of RFID sets contains more than one common RFID identifier.

Determining a plurality of RFID identifiers may be useful in a number of cases. First, it is possible that more than one tractor unit is towing a towed transport platform. For example, such a configuration might be used when a tractor unit has broken down and is being towed by another tractor unit. Also, more than one tractor unit unit might be required in order to tow a towed transport platform up a steep grade. Such a configuration may become more common with the advent of driverless trucks. Using multiple engines is a common configuration in railway transport.

Second, if the tractor unit towing a towed transport platform cannot be uniquely identified, then knowing a limited number of possibilities may still be useful. For example, a leasing entity may well be able to use this information to determine whether or not a towed transport platform it has leased to a trucking entity is being towed by the customer to whom it leased. If one of the possible RFID identifiers belongs to the customer then it is highly likely that the towed transport platform is being towed by that customer, since there are many thousands of tractor platform RFID tags in circulation.

Alternately, if none of the possible RFID identifiers belongs to the customer then it is certain that the towed transport platform is not being towed by that customer, and this is likely the more useful information to the leasing entity.

5.41 In one embodiment, a plurality of unique RFID identifiers comprises a plurality of common RFID identifiers in said set of RFID sets wherein each of said common RFID identifiers has an RFID signal strength average equal to the highest RFID signal strength average of the common RFID identifiers in said set of RFID sets.

5.42 In one embodiment, a plurality of unique RFID identifiers comprises a plurality of common RFID identifiers in said set of RFID sets wherein each of said common RFID identifiers has an RFID signal strength average within an empirically determined range of the highest RFID signal strength average of the common RFID identifiers in said set of RFID sets.

5.43 In one embodiment, a plurality of unique RFID identifiers comprises a plurality of common RFID identifiers in said set of RFID sets wherein each of said common RFID identifiers has an RFID signal strength average within a range of empirically determined values.

5.44 In one embodiment, a plurality of unique RFID identifiers comprises a plurality of common RFID identifiers in said set of RFID sets wherein each of said common RFID identifiers has an RFID signal strength standard deviation equal to the lowest RFID signal strength standard deviation of the common RFID identifiers in said set of RFID sets.

5.45 In one embodiment, a plurality of unique RFID identifiers comprises a plurality of common RFID identifiers in said set of RFID sets wherein each of said common RFID identifiers has an RFID signal strength standard deviation within an empirically determined range of the lowest RFID signal strength standard deviation of the common RFID identifiers in said set of RFID sets.

5.46 In one embodiment, a plurality of unique RFID identifiers comprises a plurality of common RFID identifiers in said set of RFID sets wherein each of said common RFID identifiers has an RFID signal strength standard deviation equal to or less than an empirically determined value.

5.47 In one embodiment, a plurality of unique RFID identifiers comprises a plurality of common RFID identifiers in said set of RFID sets wherein each of said common RFID identifiers has an RFID signal strength standard deviation within a range of empirically determined values.

5.48 In one embodiment, a plurality of unique RFID identifiers comprises a plurality of common RFID identifiers in said set of RFID sets wherein each of said common RFID identifiers has an RFID signal strength standard deviation less than or equal to an empirically determined value.

5.49 In one embodiment, a plurality of unique RFID identifiers comprises a plurality of common RFID identifiers in said set of RFID sets wherein each of said common RFID identifiers is determined by means of RFID signal strength mathematical analysis of the common RFID identifiers in said set of RFID sets.

6 State and Event Terminology 6.1 In one embodiment, a towed transport platform state comprises a state of a towed transport platform.

6.2 In one embodiment, a towed transport platform state comprises a state of a towed transport platform at a given point in time.

6.3 In one embodiment, a towed transport platform state comprises the geolocation of a towed transport platform.

6.4 In one embodiment, a towed transport platform state comprises the RFID identifier stored in a tractor platform RFID tag read by towed transport platform RFID reader physically coupled to said towed transport platform.

6.5 In one embodiment, a towed transport platform state comprises a common RFID identifier.

6.6 In one embodiment, a towed transport platform state comprises a unique RFID identifier.

6.7 In one embodiment, a towed transport platform state comprises a plurality of unique RFID identifiers.

6.8 In one embodiment, a towed transport platform state comprises whether or not a towed transport platform is physically coupled to a tractor platform.

6.9 In one embodiment, a towed transport platform state comprises whether or not a towed transport platform is electrically coupled to a tractor platform.

6.10 In one embodiment, a towed transport platform state comprises whether or not an intermodal container is physically coupled to a chassis.

6.11 In one embodiment, a towed transport platform state comprises whether a door physically coupled to said towed transport platform is open or closed.

6.12 In one embodiment, a towed transport platform state comprises whether or not said towed transport platform is moving.

6.13 In one embodiment, a towed transport platform state comprises whether or not cellular network jamming is being detected at said towed transport platform's location.

6.14 In one embodiment, a towed transport platform event comprises a change in a towed transport platform state.

6.15 In one embodiment, a towed transport platform event comprises said towed transport platform transitioning between a stationary state and moving state.

6.16 In one embodiment, a towed transport platform event comprises a change in the geolocation of said towed transport platform.

6.17 In one embodiment, a towed transport platform event comprises an impact of said towed transport platform with another physical object.

6.18 In one embodiment, a towed transport platform event comprises said towed transport platform undergoing an unusual rotation.

6.19 In one embodiment, a towed transport platform event comprises a tractor platform RFID tag moving from within the RFID range of said towed transport platform's towed transport platform RFID reader to beyond said RFID range.

6.20 In one embodiment, a towed transport platform event comprises a tractor platform RFID tag moving from beyond the RFID range of said towed transport platform's towed transport platform RFID reader to within said RFID range.

6.21 In one embodiment, a towed transport platform event comprises the physical connection of said towed transport platform to a tractor platform.

6.22 In one embodiment, a towed transport platform event comprises the physical disconnection of said towed transport platform from a tractor platform.

6.23 In one embodiment, a towed transport platform event comprises the electrical connection of said towed transport platform to a tractor platform.

6.24 In one embodiment, a towed transport platform event comprises the electrical disconnection of said towed transport platform from a tractor platform.

6.25 In one embodiment, a towed transport platform event comprises the physical coupling of an intermodal container to a chassis.

6.26 In one embodiment, a towed transport platform event comprises the physical uncoupling of an intermodal container from a chassis.

6.27 In one embodiment, a towed transport platform event comprises the opening or closing of a door physically coupled to said towed transport platform.

6.28 In one embodiment, a towed transport platform event comprises the starting or ending of cellular network jamming in the vicinity of said towed transport platform at said towed transport platform's location.

7 Networking Terminology 7.1 In one embodiment, a transceiver comprises a means for an electronic device to communicate with another electronic device wherein both said electronic devices are communicably coupled to said transceiver and wherein at least one of said electronic devices is communicably coupled to said transceiver by means of electromagnetic signals.

7.2 In one embodiment, a transceiver comprises an electronic device.

7.3 In one embodiment, an electronic device communicably coupled to another electronic device may communicate with said other electronic device.

7.4 In one embodiment, an electronic device that may communicate with another electronic device is communicably coupled to said other electronic device.

7.5 In one embodiment, a wireless modem comprises a means for an electronic device to communicate with a transceiver by means of electromagnetic signals.

7.6 In one embodiment, a wireless network comprises a transceiver communicably coupled to a plurality of electronic devices.

7.7 In one embodiment, a wireless network comprises a WiFi™ network.

7.8 In one embodiment, a wireless network comprises a Bluetooth® network.

7.9 In one embodiment, a wireless network is communicably coupled to the Internet.

7.10 In one embodiment, a cell tower transceiver comprises a transceiver physically mounted on a tower.

7.11 In one embodiment, a cellular network comprises a wireless network comprising a plurality of cell tower transceivers distributed over a geographical area wherein an electronic device may communicate with another electronic device that is communicably coupled to said wireless network and wherein said former electronic device communicates by means of any one of said cell tower transceivers by means of electromagnetic signals.

7.12 In one embodiment, a means for an electronic device to communicate with a cellular network comprises code-division multiple access technology.

7.13 In one embodiment, a cellular network comprises a 1G wireless telephone technology network.

7.14 In one embodiment, a cellular network comprises a 2G wireless telephone technology network.

7.15 In one embodiment, a cellular network comprises a 3G wireless telephone technology network.

7.16 In one embodiment, a cellular network comprises a 3.5G wireless telephone technology network.

7.17 In one embodiment, a cellular network comprises a 4G wireless telephone technology network.

7.18 In one embodiment, a cellular network comprises a 4.5G wireless telephone technology network.

7.19 In one embodiment, a cellular network comprises a 5G wireless telephone technology network.

7.20 In one embodiment, a satellite transceiver comprises a transceiver physically mounted on a satellite in earth orbit.

7.21 In one embodiment, a satellite network comprises a wireless network comprising a plurality of satellite transceivers wherein an electronic device may communicate with another electronic device that is communicably coupled to said wireless network and wherein said former electronic device may communicate by means of any one of said satellite transceivers by means of electromagnetic signals.

8 Monitoring System Terminology 8.1 In one embodiment, a monitoring system comprises a means for reading a towed transport platform state.

8.2 In one embodiment, a monitoring system comprises a means for recording a towed transport platform state.

8.3 In one embodiment, a monitoring system comprises a means for transmitting a towed transport platform state.

8.4 In one embodiment, a monitoring system comprises a means for detecting a towed transport platform event.

8.5 In one embodiment, a monitoring system comprises a means for recording a towed transport platform event.

8.6 In one embodiment, a monitoring system comprises a means for transmitting a towed transport platform event.

8.7 In one embodiment, a monitoring system is physically coupled to a towed transport platform.

8.8 In one embodiment, a monitoring system is physically coupled to a tractor platform.

8.9 In one embodiment, a computational device comprises a means for manipulating electronic signals and executing algorithms.

8.10 In one embodiment, a monitoring system comprises a computational device, a wireless modem, and an RFID reader.

FIRST EMBODIMENT

Description

The first embodiment comprises an RFID tag mounted on a tractor platform and an RFID reader mounted on a towed transport platform such that said RFID tag is within the RFID range of said RFID reader whenever said towed transport platform is hitched to said tractor platform. An example of the first embodiment is shown in FIG. 1.

Operation

In the first embodiment, said RFID reader periodically scans for RFID tags within its RFID range. When said towed transport platform is hitched to said tractor platform said RFID reader's periodic scans read the RFID identifier stored in said tractor platform's RFID tag, which identifies said tractor platform.

SECOND EMBODIMENT

Description

The second embodiment comprises the first embodiment wherein said RFID reader is communicably coupled to a computational device.

Operation

In the second embodiment, said RFID reader periodically scans for RFID tags within its RFID range, reading RFID identifiers from every RFID tag within said RFID range. Said computational device stores all the RFID identifiers read in a periodic scan in an RFID set. A plurality of periodic scans is stored in a plurality of RFID sets wherein each of said RFID sets stores the RFID identifiers read in one periodic scan. During any time period when said towed transport platform is hitched to said tractor platform, the RFID identifier of said tractor platform identifier is read and stored in an RFID set. Said computational device computes said tractor platform identifier from the plurality of RFID sets during said time period.

One use case for this embodiment occurs when said towed transport platform is being picked up at a port. In this environment multiple tractor platforms are present in a confined area such that said RFID reader may read RFID identifiers from RFID tags on multiple tractor platforms. Once said towed transport platform is hitched to said tractor platform and said tractor platform leaves said port area said RFID reader will cease reading RFID identifiers from other tractor platforms that were nearby and the computational device may determine said RFID identifier.

THIRD EMBODIMENT

Description

The third embodiment comprises the second embodiment wherein said computational device is communicably coupled to a wireless modem.

Operation

The third embodiment identifies the RFID identifier stored in said tractor platform's RFID tag as in the second embodiment. Additionally, this embodiment sends said RFID identifier to another electronic device by means of said wireless modem.

One use case for this embodiment occurs when an interested party seeks to monitor the shipment being carried on said towed transport platform. Said RFID identifier may be transmitted to said party by means of said wireless modem.

FOURTH EMBODIMENT

Description

The fourth embodiment comprises the third embodiment wherein said wireless modem is a WiFi modem.

Operation

The fourth embodiment operates as in the third embodiment wherein said wireless modem is a WiFi modem that communicates by means of a WiFi wireless network.

One use case for this embodiment is said WiFi modem transmitting said RFID identifier to an interested part by means of a connection with a WiFi hot spot on a Smartphone in said tractor platform.

FIFTH EMBODIMENT

Description

The fifth embodiment comprises the third embodiment wherein said wireless modem is a Bluetooth modem.

Operation

The fifth embodiment operates as in the third embodiment wherein said wireless modem is a Bluetooth modem that communicates by means of a Bluetooth wireless network.

One use case for this embodiment is said Bluetooth modem transmitting said RFID identifier to an interested part by means of a connection with a Bluetooth hot spot on a Smartphone in said tractor platform.

SIXTH EMBODIMENT

Description

The sixth embodiment comprises the third embodiment wherein said wireless modem is a cellular modem.

Operation

The sixth embodiment operates as in the third embodiment wherein said wireless modem is a cellular modem that communicates by means of a cellular network.

One use case for this embodiment is said cellular modem transmitting said RFID identifier to an interested part by means of a connection to a cellular network.

SEVENTH EMBODIMENT

Description

The seventh embodiment comprises the third embodiment wherein said wireless modem is a satellite modem.

Operation

The seventh embodiment operates as in the third embodiment wherein said wireless modem is a satellite modem that communicates by means of a satellite network.

One use case for this embodiment is said satellite modem transmitting said RFID identifier to an interested part by means of a connection to a satellite network.

EIGHTH EMBODIMENT

Description

The eighth embodiment comprises the third embodiment wherein said computational device is communicably coupled to a navigation system.

Operation

The eighth embodiment operates as in the third embodiment. In addition, the geolocation of said towed transport platform is read by said electronic device and transmitted to said other electronic device by means of said wireless modem.

One use case for this embodiment occurs when an interested party seeks to monitor the shipment being carried on said towed transport platform. Both the geolocation of said towed transport platform and said RFID identifier may be transmitted to said party by means of said wireless modem.

NINTH EMBODIMENT

Description

The ninth embodiment comprises the eighth embodiment wherein said navigation system comprises a satellite-based radio-navigation system.

Operation

The ninth embodiment operates as in the eighth embodiment wherein said navigation system comprises a satellite-based radio-navigation system.

TENTH EMBODIMENT

Description

The tenth embodiment comprises the ninth embodiment wherein said satellite-based radio-navigation system comprises GPS.

Operation

The tenth embodiment operates as in the ninth embodiment wherein said satellite-based radio-navigation system comprises GPS.

ELEVENTH EMBODIMENT

Description

The eleventh embodiment comprises the ninth embodiment wherein said satellite-based radio-navigation system comprises GLONASS.

Operation

The eleventh embodiment operates as in the ninth embodiment wherein said satellite-based radio-navigation system comprises GLONASS.

TWELFTH EMBODIMENT

Description

The twelfth embodiment comprises the second embodiment.

Operation

The twelfth embodiment operates as in the second embodiment wherein said computation determines the only RFID identifier common to all of said RFID sets.

One use case for this embodiment is an environment where multiple RFID tags move into and out of the RFID range of said RFID reader but only the RFID tag of said tractor platform coupled to said towed transport platform is always within said RFID range during said time period.

THIRTEENTH EMBODIMENT

Description

Figure 2:
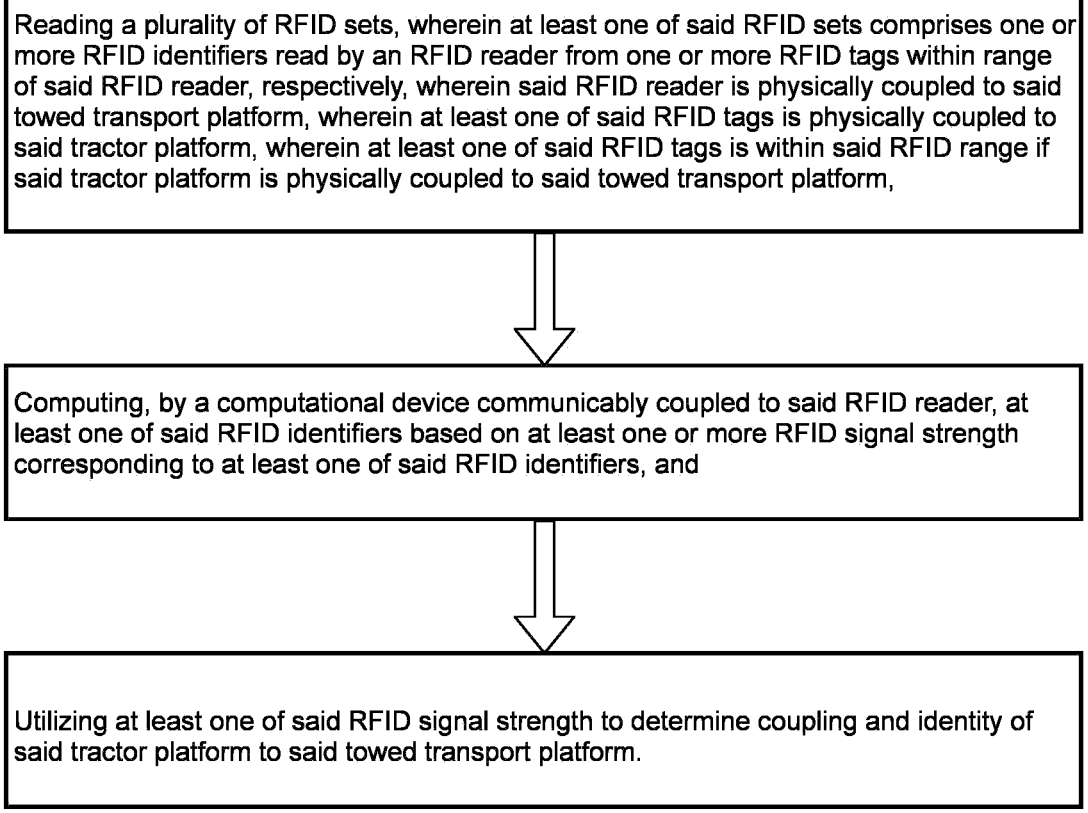
FIG. 2 is a flowchart of an example of a method performed in a system in which an RFID reader is communicably coupled to a computational device, wherein said computational device has access to the RFID signal strength associated with each RFID identifier in a plurality of RFID sets.

The thirteenth embodiment comprises the second embodiment wherein said computational device has access to the RFID signal strength associated with each RFID identifier in said plurality of RFID sets. FIG. 2 is a flowchart of an example of a method performed in accordance with the thirteenth embodiment.

Operation

The thirteenth embodiment operates as in the second embodiment wherein said computation utilizes one or more of said RFID signal strengths.

FOURTEENTH EMBODIMENT

Description

The fourteenth embodiment comprises the thirteenth embodiment.

Operation

The fourteenth embodiment operates as in the thirteenth embodiment wherein said computation comprises computing said RFID identifier as the RFID identifier with the highest RFID signal strength average across all of said RFID sets.

One use case for this embodiment is an environment where multiple RFID tags move into and out of the RFID range of said RFID reader but the RFID tag of said tractor platform coupled to said towed transport platform has a higher RFID signal strength average than the other RFID tags read during said time period.

FIFTEENTH EMBODIMENT

Description

The fifteenth embodiment comprises the thirteenth embodiment.

Operation

The fifteenth embodiment operates as in the thirteenth embodiment wherein said computation comprises computing said RFID identifier as the RFID identifier whose RFID signal strength average across all of said RFID sets most closely matches an empirically determined value.

One use case for this embodiment is an environment where multiple RFID tags move into and out of the RFID range of said RFID reader. If empirical testing shows that the RFID signal strength average of an RFID tag attached to a tractor platform coupled to said towed transport platform normally falls within a certain range of values and that the RFID signal strength averages of the other RFID tags read do not normally fall within this range, then this is an effective method for determining said RFID identifier. The RFID tag of any tractor platform coupled to said towed transport platform is likely to remain within a smaller range of distances to said RFID reader than the distances to other RFID tags.

SIXTEENTH EMBODIMENT

Description

The sixteenth embodiment comprises the thirteenth embodiment.

Operation

The sixteenth embodiment operates as in the thirteenth embodiment wherein said computation comprises computing said RFID identifier as the RFID identifier with the lowest RFID signal strength standard deviation across all of said RFID sets.

One use case for this embodiment is an environment where multiple RFID tags move into and out of the RFID range of said RFID reader. If empirical testing shows that the RFID signal strength standard deviation of an RFID tag attached to a tractor platform coupled to said towed transport platform is normally lower than that of the other RFID tags, then this is an effective method for determining said RFID identifier.

SEVENTEENTH EMBODIMENT

Description

The seventeenth embodiment comprises the thirteenth embodiment.

Operation

The seventeenth embodiment operates as in the thirteenth embodiment wherein said computation comprises computing said RFID identifier as the RFID identifier whose RFID signal strength standard deviation most closely matches an empirically determined value.

One use case for this embodiment is an environment where multiple RFID tags move into and out of the RFID range of said RFID reader. If empirical testing shows that the RFID signal strength standard deviation of an RFID tag attached to a tractor platform coupled to said towed transport platform is normally lower than that of the other RFID tags, then this is an effective method for determining said RFID identifier.

One use case for this embodiment is an environment where multiple RFID tags move into and out of the RFID range of said RFID reader. If empirical testing shows that the RFID signal strength standard deviation of an RFID tag attached to a tractor platform coupled to said towed transport platform normally falls within a certain range of values and that the RFID signal strength standard deviations of the other RFID tags read do not normally fall within this range, then this is an effective method for determining said RFID identifier. The RFID tag of any tractor platform coupled to said towed transport platform is likely to vary little in distance to said RFID reader compared to the distances to other RFID tags.

EIGHTEENTH EMBODIMENT

Description

The eighteenth embodiment comprises the eighth embodiment wherein said navigation system comprises a multilateration navigation system.

Operation

The eighteenth embodiment operates as in the eighth embodiment wherein said navigation system comprises a multilateration navigation system.

NINETEENTH EMBODIMENT

Description

The nineteenth embodiment comprises the eighteenth embodiment wherein said multilateration navigation system comprises a cellular multilateration navigation system.

Operation

The nineteenth embodiment operates as in the eighteenth embodiment wherein said multilateration navigation system comprises a cellular multilateration navigation system.

One use case for this embodiment occurs when said wireless modem is a cellular modem. Many cellular networks provide geolocation via multilateration and this capability may be built into said cellular modem, wherein it may be read by said electronic device.

Motion-Powered RFID Readers

In some examples, interested parties would like to know the identity of various assets in a transportation environment. In some examples, the asset could be a tractor platform. In other examples, the asset could be cargo associated with a transport platform. Some of the examples described herein utilize the motion of a transport platform to power an RFID reader to read an identifier stored within an RFID tag that is coupled to an asset. In some examples, the system utilizes the identifier to identify the asset, which may be transmitted to an electronic device that is accessible to the interested parties. In further examples, a geolocation of the asset may also be transmitted to an electronic device that is accessible to the interested parties.

Figure 3:
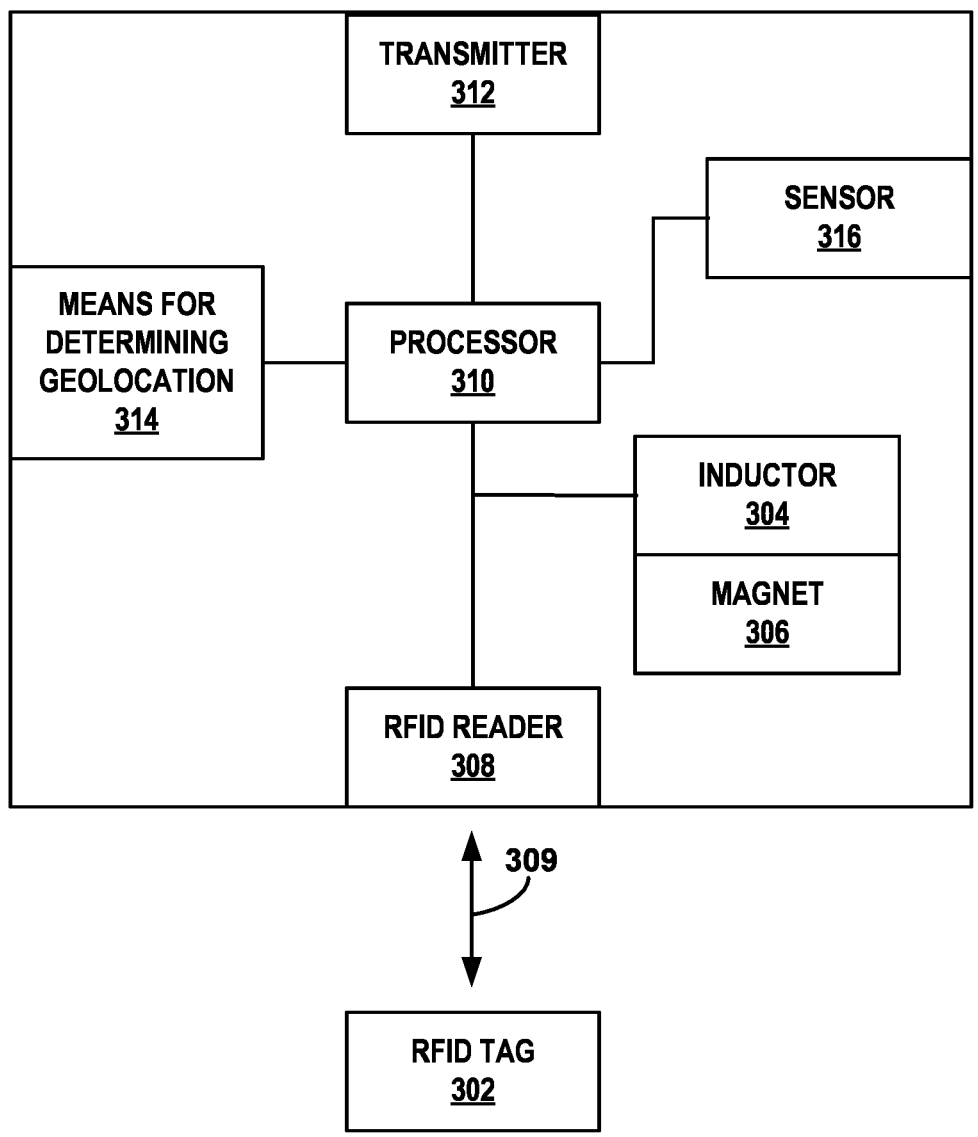
FIG. 3 shows a block diagram of an example of an asset identification system that is used to identify one or more assets associated with a transport platform.

FIG. 3 shows a block diagram of an example of an asset identification system that is used to identify one or more assets associated with a transport platform. In some examples, the transport platform is towed by a tractor platform, pulled by a locomotive, or carried by a ship or an aircraft. In further examples, the transport platform may be a shipping container that is transported in any suitable manner (e.g., via land-based transportation, boat, or aircraft).

In some examples, the asset is any suitable type of vehicle, vessel, aircraft, or watercraft capable of moving the transport platform. Thus, in some examples, the asset is a tractor platform coupled to the transport platform. In other examples, the asset is cargo associated with a transport platform. The cargo is considered "associated with" the transport platform if the cargo is disposed within or on the transport platform or otherwise coupled to the transport platform.

In the example shown in FIG. 3, asset identification system 300 includes radio-frequency identification (RFID) tag 302 coupled to an asset, inductor 304, magnet 306, and RFID reader 308 electrically coupled to inductor 304. In some examples, magnet 306 is disposed such that relative movement between magnet 306 and inductor 304 caused by movement of the transport platform induces electrical power. Thus, in some examples, power is generated from the motion of the transport platform while in transit. In the example shown in FIG. 3, RFID reader 308 is directly electrically coupled to inductor 304. However, in other examples, RFID reader 308 may be indirectly electrically coupled to inductor 304 by a battery, a capacitor, and/or a supercapacitor, or any other suitable electrical component. The electrical power is used to power RFID reader 308 so that RFID reader 308 can read, via wireless signals 309, an RFID identifier stored within RFID tag 302 when the asset is within range of RFID reader 308.

The example of asset identification system 300 shown in FIG. 3 also includes processor 310 coupled to RFID reader 308. As used herein, processor 310 includes any combination of hardware, software, and/or firmware for executing the functions described herein as well as facilitating the overall functionality of asset identification system 300. In some examples, processor 310 may be a microprocessor or processor arrangement (e.g., on which code is running) connected to memory (not shown in FIG. 3). In some examples, processor 310 is used to determine, based at least partially on the RFID identifier read from RFID tag 302, an identity of the asset to which RFID tag 302 is coupled.

As shown in FIG. 3, asset identification system 300 may also include transmitter 312, in some examples, to transmit the identity of the asset to an electronic device. In the example shown in FIG. 3, transmitter 312 includes electronics configured to transmit wireless signals. In some situations, transmitter 312 may include multiple transmitters. Transmitter 312 transmits signals through an antenna (not shown in FIG. 3). In some circumstances, the antenna may include multiple antennas. Transmitter 312 performs radio frequency (RF) processing including modulation. Transmitter 312 includes a modulator (not shown in FIG. 3) that modulates the signals for transmission and can apply any one of a plurality of modulation orders. Transmitter 312 may include filters, amplifiers, isolators, matching circuits, and other RF components. In other examples, transmitter 312 may utilize any suitable wired or wireless communication technology, including cellular, Bluetooth, Wi-Fi (e.g., one of the Institute of Electrical and Electronics Engineers (IEEE) 802.11 standards), etc.

In further examples, asset identification system 300 may also include means for determining a geolocation 314 of the transport platform. In some examples, the means for determining a geolocation 314 may include one or more global navigation satellite system (GNSS) receivers. In these examples, transmitter 312 may also be used to transmit the geolocation of the transport platform to the electronic device.

The example of asset identification system 300 shown in FIG. 3 additionally includes sensor 316 to sense when a door of the transport platform is open such that RFID reader 308 scans for RFID tags within range of RFID reader 308, in response to sensing that the door of the transport platform is open. Thus, in these examples, upon receipt of one or more signals from sensor 316 indicating that the door of the transport platform is open, processor 310 sends one or more control signals to RFID reader 308 to scan for RFID tags. In this manner, asset identification system 300 can more accurately log the contents (e.g., cargo) of the transport platform and/or the identity of the vehicle/vessel to which the transport platform is coupled when the door of the transport platform is opened.

Figure 4:
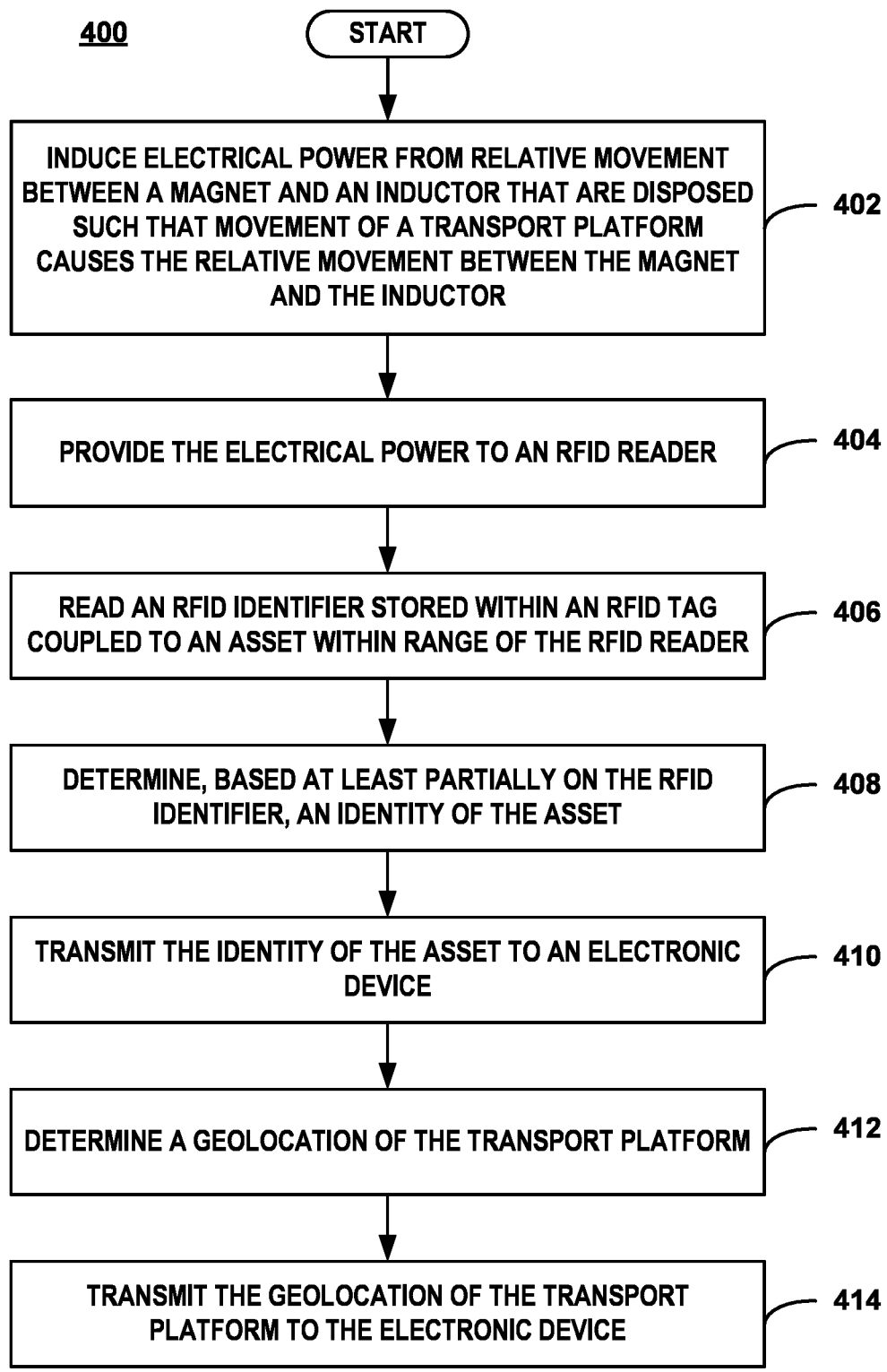
FIG. 4 is a flowchart of an example of a method for identifying one or more assets associated with a transport platform.

FIG. 4 is a flowchart of an example of a method for identifying one or more assets associated with a transport platform. The method 400 begins at step 402 with inducing electrical power from relative movement between a magnet and an inductor that are disposed such that movement of the transport platform causes the relative movement between the magnet and the inductor. At step 404, the electrical power is provided to a radio-frequency identification (RFID) reader. At step 406, the RFID reader reads an RFID identifier stored within an RFID tag coupled to an asset when the asset is within range of the RFID reader. At step 408, an identity of the asset is determined, based at least partially on the RFID identifier. At step 410, the identity of the asset is transmitted to an electronic device. At step 412, a geolocation of the transport platform is determined. At step 414, the geolocation of the transport platform is transmitted to an electronic device. In other examples, one or more of the steps of method 400 may be omitted, combined, performed in parallel, or performed in a different order than that described herein or shown in FIG. 4. In still further examples, additional steps may be added to method 400 that are not explicitly described in connection with the example shown in FIG. 4.

Clearly, other examples and modifications of the foregoing will occur readily to those of ordinary skill in the art in view of these teachings. The above description is illustrative and not restrictive. The examples described herein are only to be limited by the following claims, which include all such examples and modifications when viewed in conjunction with the above specification and accompanying drawings. The scope of the foregoing should, therefore, be determined not with reference to the above description alone, but instead should be determined with reference to the appended claims along with their full scope of equivalents.

The invention claimed is:

1. An asset identification system to identify one or more assets associated with a transport platform, the system comprising:
   a radio-frequency identification (RFID) tag coupled to an asset;
   an inductor;
   a magnet disposed such that relative movement between the magnet and the inductor caused by movement of the transport platform induces electrical power; and
   an RFID reader electrically coupled to the inductor, the RFID reader to read an RFID identifier stored within the RFID tag when the asset is within range of the RFID reader.

2. The asset identification system of claim 1, wherein the asset is a tractor platform coupled to the transport platform.

3. The asset identification system of claim 1, wherein the asset is cargo associated with the transport platform.

4. The asset identification system of claim 1, further comprising:
   a processor coupled to the RFID reader, the processor to determine, based at least partially on the RFID identifier, an identity of the asset.

5. The asset identification system of claim 4, further comprising:
   a transmitter to transmit the identity of the asset to an electronic device.

6. The asset identification system of claim 5, further comprising:
   means for determining a geolocation of the transport platform,
   the transmitter to transmit the geolocation of the transport platform to the electronic device.

7. The asset identification system of claim 1, further comprising:
   a sensor to sense when a door of the transport platform is open,
   in response to sensing that the door of the transport platform is open, the RFID reader scans for RFID tags within range of the RFID reader.

8. A method for identifying one or more assets associated with a transport platform, the method comprising:
   inducing electrical power from relative movement between a magnet and an inductor that are disposed such that movement of the transport platform causes the relative movement between the magnet and the inductor;
   providing the electrical power to a radio-frequency identification (RFID) reader; and
   reading, with the RFID reader, an RFID identifier stored within an RFID tag coupled to an asset, when the asset is within range of the RFID reader.

9. The method of claim 8, wherein the asset is a tractor platform coupled to the transport platform.

10. The method of claim 8, wherein the asset is cargo associated with the transport platform.

11. The method of claim 8, further comprising:
    determining, based at least partially on the RFID identifier, an identity of the asset.

12. The method of claim 11, further comprising:
    transmitting the identity of the asset to an electronic device.

13. The method of claim 12, further comprising:
    determining a geolocation of the transport platform; and
    transmitting the geolocation of the transport platform to the electronic device.

14. The method of claim 8, further comprising:
    sensing when a door of the transport platform is open; and
    in response to sensing that the door of the transport platform is open, scanning, with the RFID reader, for RFID tags within range of the RFID reader.

* * * * *